United States Patent [19]

Kirkpatrick et al.

[11] Patent Number: 5,115,029

[45] Date of Patent: May 19, 1992

[54] EXTRUDABLE POLYMERIC COMPOSITION

[75] Inventors: Donald E. Kirkpatrick, Midland, Mich.; James A. Stevenson, Pittsburgh, Pa.; Kun S. Hyun, Midland, Mich.

[73] Assignee: The Dow Chemical Company, Midland, Mich.

[21] Appl. No.: 484,748

[22] Filed: Feb. 26, 1990

Related U.S. Application Data

[63] Continuation-in-part of Ser. No. 219,619, Jan. 15, 1988, abandoned.

[51] Int. Cl.⁵ .............. C08L 27/08; C08K 3/24; C08K 3/32
[52] U.S. Cl. .................. 525/239; 524/527; 524/433; 524/417; 524/414
[58] Field of Search ............ 525/239, 192; 524/417, 524/568, 433, 414, 275, 278

[56] References Cited

U.S. PATENT DOCUMENTS

| | | | |
|---|---|---|---|
| 3,565,975 | 2/1971 | Goff et al. | 525/222 |
| 4,203,880 | 5/1980 | Stoloff et al. | 260/23 XA |
| 4,246,150 | 1/1981 | Bower | 260/28.5 |
| 4,501,848 | 2/1985 | Bourland | 525/239 |
| 4,950,718 | 8/1990 | Burgert et al. | 525/239 |

Primary Examiner—Carman J. Securro

[57] ABSTRACT

In one embodiment, the present invention is a polymeric composition, in pellet form, which comprises a vinylidene chloride interpolymer, and a friction reducing polymer (FRP) in an amount of from about 0.1 to about 40 weight percent, said weight percent being based on the total weight of the polymeric composition. The FRP is selected to selected to lower the frictional coefficient and the mechanical energy to extrude of the polymeric composition. In another embodiment, the present invention is a polymeric composition, in either power or pellet form, possessing improved extrudability, composition comprises a vinylidene chloride interpolymer in an amount of from about 55 to about 99.85 weight percent, a FRP in an amount from about 0.1 to about 40 weight percent, and a salt of an acid in an amount of between about 0.05 and about 5 weight percent, said weight percents being based on the total weight of the polymeric composition.

24 Claims, No Drawings

EXTRUDABLE POLYMERIC COMPOSITION

CROSS-REFERENCE TO RELATED APPLICATION

This application is a continuation-in-part of the copending application Ser. No. 219,619, filed July 15, 1988, now abandoned.

FIELD OF THE INVENTION

The present invention relates to a thermoplastic composition possessing improved processing properties. Specifically, this invention relates to a thermoplastic composition of a vinylidene chloride interpolymer, and pellets made therefrom.

BACKGROUND OF THE INVENTION

Vinylidene chloride interpolymers are well known in the prior art. Such polymers are also well known to be thermally unstable, which means that upon exposure to desirable processing temperatures such polymers tend to generate undesirable physical properties such as an increased level of carbonaceous material contamination (i.e., contamination by a variety of dark and intensely-colored species), evolve hydrogen chloride, and have poor extrudability, e.g., discoloration.

In an effort to improve the extrudability of polymeric compositions comprising vinylidene chloride interpolymers, such compositions are fabricated, in either powder or pellet form, mainly from vinylidene chloride interpolymers and an adequate amount of modifiers such as stabilizers, plasticizers, etc. When using no modifiers with the vinylidene chloride interpolymer, the high frictional and viscous forces on the vinylidene chloride interpolymer result in the vinylidene chloride interpolymer being subject to thermal decomposition, e.g., having carbonaceous material contamination, discoloration, or hydrogen chloride evolvement due to the close proximation of the processing temperature to the vinylidene chloride interpolymer's thermal decomposition point. Moreover, the decomposed interpolymer may generate an undesirable level of carbonaceous material contamination in the extrudate which, if the carbonaceous material extends through the thickness of the extrudate article, could have a deleterious effect upon the gas permeability of the extrudate.

However, in order to industrially extrude and process vinylidene chloride interpolymers without carbonaceous material contamination, discoloration, or hydrogen chloride evolvement in the product, a relatively large amount of stabilizer and plasticizer would inevitably have to be incorporated into the resin. The larger amount of plasticizer reduces the melt viscosity, thereby reducing the processing temperature which improves thermal stability; and the larger amount of stabilizer improves the thermal stability of the polymeric composition. However, the relatively large amount of a stabilizer and plasticizer increases the permeability of the extrudate to atmospheric gases.

In the past, the practice has been to extrude the vinylidene chloride interpolymer directly from the powdered form in which it is recovered. Because of the convenience of shipping and handling, it is desirable to form the vinylidene chloride interpolymer into pellets prior to final extrusion. As the demand for pellets has increased, the demand has increased for a pellet which can withstand the myriad processing conditions to which powdered resins are subjected.

While pellets of thermally sensitive polymeric compositions may be an advantageous form from which to fabricate articles, such pellets of thermally sensitive polymeric compositions are particularly difficult to extrude. Pellet formation requires an exposure of the thermoplastic composition to heat prior to being extruded into an article. This additional heat history is believed to make the pellet form of the polymeric composition more susceptible to thermal instability. Consequently, additive packages which improve the thermal stability of thermally sensitive polymeric compositions in powder form do not necessarily improve the thermal stability of thermally sensitive polymeric compositions in pellet form.

Although satisfactorily extrudable for a period, it has been found that attempts to extrude vinylidene chloride interpolymer pellets over long periods on certain extrusion equipment have also proven unsatisfactory due to an undesirable level of carbonaceous material contamination, increased discoloration, or higher hydrogen chloride in the extrudate. Additive packages which improve the thermal stability of thermally sensitive polymeric compositions in powder form do not necessarily improve the thermal stability of thermally sensitive polymeric compositions in pellet form.

It is desirable to produce a polymeric composition which, if subjected to desirable elevated processing temperatures, generates a reduced level of carbonaceous material contamination, evolves less hydrogen chloride, or has better extrudability, e.g., color, than vinylidene chloride interpolymer alone. Moreover, when the polymeric composition is processed at desirable temperatures the extrudate also possesses a reduced level of carbonaceous material contamination, less discoloration, or less hydrogen chloride evolvement than an extrudate formed from vinylidene chloride interpolymer alone. It is to this goal that the present invention is directed.

SUMMARY OF THE INVENTION

The present invention concerns an extrudable pellet of a polymeric composition which comprises: (a) a vinylidene chloride interpolymer in an amount of from about 60 to about 99.9 weight percent, said weight percent being based on the total weight of the polymeric composition, the interpolymer being formed from a monomer mixture comprising vinylidene chloride in an amount of from about 60 to about 99 percent, based on total weight of monomer mixture, and at least one ethylenically unsaturated comonomer copolymerizable therewith in an amount of from about 1 to about 40 percent, based on total weight of monomer mixture; and (b) from about 0.1 to about 40 weight percent, based on the total weight of the polymeric composition, of a friction reducing polymer (FRP) being selected to lower the frictional coefficient and the mechanical energy to extrude of the polymeric composition, based on the total weight of the polymeric composition: whereby the pellet exhibits improved extrudability when subjected to desirable melt processing temperatures.

In another embodiment, the present invention concerns a pellet of a thermally sensitive resin having improved extrudability comprising (a) a vinylidene chloride interpolymer in an amount of from about 60 to about 99.9 weight percent, the interpolymer being formed from a monomer mixture comprising vinylidene chloride in an amount of from about 60 to about 99 percent, based on total weight of monomer mixture, and at least one ethylenically unsaturated comonomer copolymerizable therewith in an amount of from about 40 to about 1 percent, based on total weight of the polymeric composition: and (b) a friction reducing polymer (FRP) selected to lower the frictional coefficient and the mechanical energy to extrude of the polymeric composition, in an amount of from about 0.1 to about 40 weight percent, said weight percents being based on the total weight of the polymeric composition.

DETAILED DESCRIPTION OF THE INVENTION

The present invention pertains to vinylidene chloride interpolymers blended with a variety of additives to form a polymeric composition or plastic. By "polymeric composition or plastic" is meant the mixture of the vinylidene chloride interpolymer and any additives.

In one embodiment, the present invention is a polymeric composition in pellet form, said pellet having improved extrudability. By "improved" extrudability is meant that the polymeric composition in pellet form can be extruded into an extrudate which possesses less carbonaceous material contamination, less discoloration, and less hydrogen chloride than an article formed from a pellet of vinylidene chloride interpolymer alone.

Vinylidene chloride interpolymers suitable for use in the present invention are those vinylidene chloride interpolymers formed from a monomer mixture of vinylidene chloride monomer and an amount of one or more ethylenically unsaturated comonomers copolymerizable with vinylidene chloride monomer.

Suitable ethylenically unsaturated comonomers copolymerizable with the vinylidene chloride monomer include vinyl chloride, alkyl acrylates, alkyl methacrylates, acrylic acid, methacrylic acid, itaconic acid, acrylonitrile and methacrylonitrile. The alkyl acrylates and alkyl methacrylates are generally selected to have from about 1 to about 8 carbon atoms per alkyl group. Preferably, alkyl acrylates and alkyl methacrylates are selected to have from about 1 to about 4 carbon atoms per alkyl group. The alkyl acrylates and alkyl methacrylates are most preferably selected from the group consisting of vinyl chloride, methyl acrylate, ethyl acrylate, and methyl methacrylate.

In preparing the monomer phase, such phase comprises a mixture containing essentially all of the monomer to be polymerized. An effective amount of polymerized vinylidene chloride monomer is generally in the range of from about 60 to about 99 weight percent based upon the total weight of the interpolymer. The monomer mixture generally comprises the ethylenically unsaturated comonomer or comonomers copolymerizable with the vinylidene chloride monomer in an amount of from about 40 to about 1 weight percent based on total weight of the vinylidene chloride interpolymer. The preferred ranges, as is known to the skilled artisan, are dependent upon the ethylenically unsaturated comonomer copolymerized therewith.

The amount of ethylenically unsaturated comonomer is maintained below an amount sufficient to destroy the semicrystalline character of the interpolymer. By "semicrystalline character" it is meant that the interpolymer has between about 5 percent and about 95 percent crystallinity. Crystallinity values depend upon the measuring technique, and as used herein crystallinity is defined by the commonly used density method.

See, for example, the discussion by R. Wessling, in Chapter 6 of *Polyvinylidene Chloride,* Vol. 5, Gordon and Breach Science Publishers, New York, 1977, the teachings of which are incorporated herein by reference.

When the ethylenically unsaturated comonomer employed is vinyl chloride, the vinyl chloride in the interpolymer will preferably be present in an amount of from about 30 to about 5 percent by weight of interpolymer and the amount of vinylidene chloride is from about 70 to about 95 percent by weight of interpolymer, preferably the vinyl chloride in the interpolymer will be present in an amount of from about 25 to about 10 percent by weight of interpolymer and the amount of vinylidene chloride is from about 75 to about 90 percent by weight of interpolymer.

When the ethylenically unsaturated comonomer employed is an alkyl acrylate, the alkyl acrylate in the interpolymer will preferably be present in an amount of from about 15 to about 2 percent by weight of interpolymer and the amount of vinylidene chloride is from about 85 to about 98 percent by weight of interpolymer, preferably the alkyl acrylate in the interpolymer will be present in an amount of from about 10 to about 3 percent by weight of interpolymer and the amount of vinylidene chloride is from about 90 to about 97 percent by weight of interpolymer.

Methods of forming the vinylidene chloride interpolymers suitable for use in the present invention are well known in the prior art. The vinylidene chloride interpolymer is generally formed through an emulsion or suspension polymerization process. Exemplary of such processes are U.S. Pat. Nos. 2,558,728; 3,007,903; 3,642,743; and 3,879,359; and the methods described by R. A. Wessling, in *Polyvinylidene Chloride,* Gordon and Breach Science Publishers, New York, 1977, Chapter 3: all of which are incorporated herein by reference. Typically, the monomeric materials are emulsified or suspended in an aqueous phase. The aqueous phase contains a polymerization initiator and a surface active agent capable of emulsifying or suspending the monomeric materials in the aqueous phase. The polymerization of the monomeric materials is usually carried out with heating and agitation.

After polymerization is complete, the resulting suspension or emulsion slurry of vinylidene chloride interpolymer has a majority of an aqueous phase. The resultant slurry is vacuum stripped. Thereafter, the slurry is cooled down, unloaded and dewatered, and the resin is collected and further dried.

Methods of forming the mixture into pellets are well-known to those skilled in the art. Any method capable of forming the mixture into pellets is suitable for use in the present invention. For the purposes of this invention, the terms "pellet" or "pellets" refer to particles having a minimum cross-sectional dimension of at least 1/32 inch, preferably of at least 1/16 inch, and most preferably of at least 1/8 inch, said pellets suitably have a maximum cross-sectional dimension of at least ½ inch, preferably of at least ⅜ inch, and most preferably of at least ¼ inch. An exemplary method of forming the mixture into pellets includes extruding the mixture through a strand die to form an extruded strand and chopping the extruded strand into pellets.

The friction reducing polymers (FRP) of the present invention are those polymers selected to lower the frictional coefficient and the mechanical energy to extrude of the polymeric composition.

"Frictional coefficient" is a measure of the coefficient of friction of the solid polymer upon a solid material other than the polymer itself. Obviously, the lower the frictional coefficient of the FRP, the more it will the lower frictional coefficient of a polymeric composition containing the FRP. The frictional coefficient of the polymeric composition should be at least 20 percent lower than the frictional coefficient of the polymeric composition not containing the FRP.

One method of measuring friction is by impinging a sample of known cross-section on a rotating roll. The ratio of the tangent force to the radial impinging force is defined as the coefficient of friction (COF). An apparatus called a "screw simulator" is used to allow the measurement of COF at conditions normally found in an extruder feed section. The apparatus and process is described in detail in the following article: C. I. Chung et al., Polym. Eng. Sci., 17 (1), 9 (1977).

Viscosity is the resistance to flow. Viscosity is a function of many variables including molecular weights with higher molecular weight polymers having higher viscosities. Generally, the viscosity of the FRP should be in the range of 200 percent to 5 percent of the vinylidene chloride interpolymer. Preferably, the viscosity of the FRP should be at least 750 poise at a temperature of 175° C., measured at 100 sec$^{-1}$.

The effect of friction and viscosity on the extrusion process is evaluated via mechanical energy to extrude (MEE). Mechanical energy defines the amount of energy which has been viscously and frictionally dissipated to the polymer during extrusion. Specifically, mechanical energy to extrude is the sum of energy expended to extrude the starting sample as it comes out of the extruder due to friction and the viscosity of the polymeric composition to be extruded.

A detailed discussion of mechanical energy to extrude is set forth in *Principles of Polymer Processing*, Tadmor, Z., and Gogos, C., Chapter 12, Wiley and Sons, (1979).

MEE of a given sample is determined by measuring the torque of an extruder screw during processing which allows the calculation of the energy which has been frictionally and viscously dissipated to the polymer during extrusion.

This torque value can then be used to calculate the energy expended by the extruder screw, via friction and viscous energy dissipation, per volume of material extruded. The calculation is as follows.

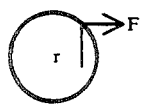

r = radius (m)
F = force (N)
f = frequency (1/min)
t = time (min)
E = eneryg (J)
τ = torque (Nm)
D = distance (m)
P = power (J/min)

F = τ/r  [1]
D = 2πrft  [2]
E = FD  [3]

Equations [1], [2] and [3] are combined to yield the following:

$$E = \tau 2\pi ft \quad [4]$$

The rate of energy expended or power is then calculated from P=E/t. Knowing then the rate of energy expended and the material flow rate (Q) this allows the calculation of energy to extrude a volume of material as shown.

$$\frac{P \text{ (J/min)}}{Q \text{ (cm}^3\text{/min)}} = \frac{E}{\text{Unit Output}} \text{ (J/cm}^3\text{)}^3 \quad (4)$$

Generally, by "FRP" is meant olefin homopolymers and olefin interpolymers; and fluoropolymers.

Exemplary olefin homopolymers and olefin interpolymers include the ultra-low density polyethylenes, low density polyethylenes, linear low density polyethylenes, medium density polyethylenes, and high density polyethylenes. High density polyethylene is particularly preferred.

The polyolefin may also be copolymerized with a minor amount of one or more of a variety of substituent comonomers. For the purpose of this invention, a "up to a minor amount of a comonomer" means that the copolymer may contain at least one comonomer below an amount that will significantly increase the frictional coefficient properties from that of the ethylene homopolymer. To "significantly increase" the frictional coefficient properties is meant that the frictional coefficient of the polymeric composition will be increased to a value greater than 20 percent below the the frictional coefficient of the polymeric composition without the copolymer. Exemplary comonomers include the halogens and comonomers which may contain oxygen. In halogenated polyethylenes, the halogen bonded to the α-monoolefin polymer backbone supplies all or part of the halogenated organic moiety.

Preferable polyolefins have a degree of polymerization of at least 715 based on a methylene unit, a melting point in the range of 70° C. to 175° C., and a density in the range of 0.85 to 1.1. To have a degree of polymerization above 715, the polyolefin will have a corresponding average molecular weight of at least 10,000. Such polyolefins are preferred because they reduce the frictional coefficient in the solid phase of the interpolymer as it is extruded. High density polyethylenes are most preferred, because of their relatively low coefficients of friction.

Techniques for preparing the polyolefins are well-known in the art. The *Kirk-Othmer Encyclopedia of Chemical Technology*, Volume 16, 3rd edition, (1980) sets forth general preparation methods.

Also included within the definition of FRP are fluoropolymers having at least 35 weight percent of fluorine, based on the total weight of the polymer. Exemplary fluorine containing polymers include polytetrafluoroethylene, chlorotrifluorethylene: polyvinylfluoride: polyvinylidene fluoride: poly(heptafluor butyl acrylate) copolymers of polyvinylfluoride and hexafluoropropylene: copolymers of polyvinylfluoride and chlorotrifluoroethylene: and copolymers of hexafluoropentanediol and adipic acid.

Preferable fluorine containing polymers have a melting point in the range of 70° C. to 225° C., and an average molecular weight of at least 20,000. Such fluorine containing polymers are preferred because they reduce the frictional coefficient in the solid phase of the interpolymer a it is extruded.

Techniques for preparing the fluorine containing polymers are well known in the art. The *Kirk-Othmer Encyclopedia of Chemical Technology*, 3rd edition, (1980) sets forth general preparation methods.

The FRP is suitably blended with the vinylidene chloride interpolymer in an amount of from about 0.1 to about 40 weight percent of polymeric composition. Preferably, the FRP is blended with the vinylidene chloride interpolymer in an amount of from about 0.3 to about 15 weight percent of the polymeric composition. More preferably, the FRP is blended with the vinylidene chloride interpolymer in an amount of from about 0.4 to about 5 weight percent of polymeric composition. Most preferably, the FRP is blended with the vinylidene chloride interpolymer in an amount of from about 0.5 to about 2 weight percent of polymeric composition.

In a preferred embodiment, the amount of FRP added to the vinylidene chloride interpolymer will be dependent upon the rheology of the FRP. That is, phase inversion is viscosity dependent and each FRP should be added in an amount below which it would phase invert with the vinylidene chloride interpolymer to become the continuous phase. A polymeric composition with a FRP as the continuous phase will have relatively poor barrier. The amount of FRP below which phase inversion occurs is readily determined by one skilled in the art without requiring undue experimentation.

In another embodiment, the present invention is the polymeric composition, in either powder or pellet form, further comprising a salt of an acid. The inventors have discovered that the salt of an acid further improves the extrudability of the polymeric composition.

For the purposes of this invention, improved extrudability means that, if subjected to desirable elevated processing temperatures, the polymeric composition generates a reduced level of carbonaceous material contamination, evolve less hydrogen chloride, or have good extrudability, e.g., color than vinylidene chloride interpolymer alone. Moreover, when the polymeric composition is processed at desirable temperatures the extrudate also possesses a reduced level of carbonaceous material contamination, reduced discoloration, or less hydrogen chloride evolvement than the extrudate of vinylidene chloride interpolymer alone.

The salt of an acid may be blended separately with the vinylidene chloride interpolymer and the FRP, or may be concurrently blended with the FRP and the vinylidene chloride interpolymer.

The salt of an acid may be added in an amount effective to provide an improved color stability of the polymeric composition. Although not intended to be bound by theory, it is believed that the weak acid salts act as heat stabilizers by scavenging evolved HCl, providing an effective reduction in the amount of free HCl in the polymeric composition. Generally the salt of a weak acid will be added in an amount in the range of about 0.05 to about 5 weight percent, preferably 0.1 to about 3 weight percent, preferably in the range of about 0.4 to about 2 weight percent, said weight percents based upon the weight of the polymeric composition.

Salts of weak or strong acids include salts of inorganic and organic acids (salts of an acid). Salts of inorganic acids include those conventionally defined, in an aqueous medium, as soluble inorganic salts of acids (e.g., tetrasodium pyrophosphate): partially soluble inorganic salts of acids (e.g., magnesium oxide, and magnesium hydroxide): and relatively insoluble inorganic salts of acids (e.g., calcium hydroxy phosphate (commonly referred to tricalcium phosphate)). Persons skilled in the art will recognize that the actual solubility of the salt depends upon a number of variables, e.g., the ratio of salt to water, pH, etc.

Exemplary salts of organic acids include methyl trisodium pyrophosphate, diisoamyl dipotassium pyrophosphate and the like. Suitable results may also be obtained with organometallic polyphosphates which include the tripolyphosphates, such as t-butyl tetrapotassium tripolyphosphate and the like: and tetrapolyphosphates, such as triethyl tripotassium tetrapolyphosphate and the like. The most preferred salt of an acid is magnesium hydroxide, such as Kisuma 5B which is commercially available from the Kyowa Chemical Co, Japan.

Salts of an acid suitable for purposes of the present invention are prepared by processes well-known in the art. By way of illustration only, techniques for preparing magnesium hydroxide, tetrasodium pyrophosphate, and tricalcium phosphate are set forth in *The Merck Index*, 10th Edition, (1983), which is hereby incorporated by reference.

The particulate salts of an acid suitably have an average particle diameter which is less than or equal to the average particle diameter of the vinylidene chloride interpolymer being stabilized. Persons skilled in the art will recognize that the effectiveness of the salts of an acid is generally related to the surface area of the salt employed. For purposes of this invention, the salt of an acid beneficially has a weight average particle diameter of from about 1 to about 50 microns. One skilled in the art, without undue experimentation, will be able to determine the optimum particle size for specific components.

Additives which may be incorporated into the polymeric composition of the present invention are selected from the group consisting of fillers, plasticizers, heat stabilizers, processing aids, light stabilizers, pigments and the like. Each of these additives is known and several types of each are commercially available. The additives may be incorporated when the polymer components of the polymeric composition are blended together or may be added to the polymeric composition later. Additive type and amount thereof will depend upon several factors. One factor is the intended use of the plastic. A second factor is tolerance of the polymeric compositions for the additives. That is, how much additive can be added before physical properties of the polymeric compositions are adversely affected to an unacceptable level. Other factors are apparent to those skilled in the art of polymer formulation and compounding.

A preferred extrusion formulation package has been found to provide uniquely beneficial results when the polymeric composition is fabricated into a pellet. The combination is taught in copending application number 164,741, filed on Mar. 7, 1988, the teachings of which are hereby incorporated by reference. Generally, that application teaches a polymeric composition which comprises (a) from about 59.8 to about 99.7 weight percent of a vinylidene chloride interpolymer, and (b) from about 40.2 to about 0.3 weight percent of an extrusion formulation package, said weight percents being based upon the total weight of the polymeric composition.

The interpolymer is formed from a monomer mixture comprising vinylidene chloride in an amount of from about 60 to about 99 weight percent, based on total weight of monomer mixture, and at least one ethylenically unsaturated comonomer copolymerizable therewith in an amount of from about 40 to about 1 weight percent, based on total weight of monomer mixture. The extrusion formulation package comprises from about 0.05 to about 5 weight percent, based on the total weight of the polymeric composition, of a salt of a weak base and the remainder of the formulation package comprises at least two components selected from the group consisting of (a) a FRP selected to lower the frictional coefficient of the polymeric composition, (b) a plasticizer, and (c) at least one external lubricant selected from the group consisting of (i) an oxidized polyolefin different from the first polyolefin, and (ii) polyolefin waxes or oils.

Blending of the components of the polymeric composition can be accomplished by using conventional melt processing, as well as dry blending techniques.

In using conventional processing equipment for thermally sensitive polymers, three conditions should be met. Two conditions, which are interrelated, are processing time and processing temperature. In melt processing polymers, it is generally recognized that as processing temperatures increase, processing times must decrease in order to avoid undesirable results such as polymer degradation. Melt processing must be accomplished at a temperature below that at which decomposition of the vinylidene chloride interpolymer becomes significant. A third condition is that sufficient mixing must be generated during melt processing to provide a visually homogeneous blend, i.e., no visible solids, with a reasonable mixing time.

Exemplary melt processing equipment includes heated two-roll compounding mills, Brabender mixers, Banbury mixers, single screw extruders, twin screw extruders, and the like, which are constructed for use with thermally sensitive polymers. See, for example, the discussion by R. Wessling, in Chapter 11 of *Polyvinylidene Chloride*, supra, the teachings of which are incorporated herein by reference. Desirable results are obtained when an extruder, either single screw or twin screw, is used for melt processing the components of the polymeric composition.

When dry blending, the components should be mixed to form a visually uniform admixture. Suitable dry blending equipment includes Hobart mixers, Welex mixers, Henschel High Intensity mixers, and the like.

The polymeric composition, in either powder or pellet form, may be fabricated into any suitable final product, e.g., a variety of films or other articles. As is well known in the art, the films and articles are fabricated with conventional coextrusion, e.g., feedblock coextrusion, multimanifold die coextrusion, or combinations of the two: injection molding: extrusion molding: calendering: thermoforming: and lamination techniques. Articles formed therefrom include blown and cast, mono and multilayer, films: rigid and foam sheet: tubes: pipes: rods: fibers; and various profiles. Lamination techniques are particularly suited to produce multi-ply sheets. As is known in the art, specific laminating techniques include fusion, i.e., whereby self-sustaining lamina are bonded together by applications of heat and pressure: wet combining, i.e., whereby two or more plies are laminated using a tie coat adhesive, which is applied wet, the liquid driven off, and combining by subsequent pressure laminating in one continuous process: or by heat reactivation, i.e., combining a precoated film with another film by heating and reactivating the precoat adhesive so that it becomes receptive to bonding after subsequent pressure laminating.

Exemplary articles include rigid containers used for the preservation of food, drink, medicine and other perishables. Such containers should have good mechanical properties, as well as low gas permeabilities to, for example, oxygen, carbon dioxide, water vapor, odor bodies or flavor bodies, hydrocarbons or agricultural chemicals. Most organic polymers such as the polyolefins, styrene polymers and the like, by themselves, do not possess sufficient resistance to transmission of atmospheric gases and vapors. Consequently, multilayer sheet structures employed in packaging materials have organic polymer skin layers laminated on each side of a vinylidene chloride interpolymer barrier layer, generally with glue layers used to promote adhesion between the barrier layer and dissimilar material layers.

The present invention is illustrated in further detail by the following examples. The examples are for the purposes of illustration only, and are not to be construed as limiting the scope of the present invention. All parts and percentages are by weight unless otherwise specifically noted.

EXAMPLES

Polymeric compositions according to the present invention are prepared in the following manner.

Each of the polymeric components used in the examples and comparative examples is coded and described hereinafter at Table I.

TABLE I

| Code | Polymer Components |
|---|---|
| PVdC-1 | A polymeric composition containing 1 weight percent of epoxidized soybean oil commercially available from Viking Chemical Co. under the trade designation Vikoflex 7177; 2 weight percent tetrasodium pyrophosphate commercially available from Monsanto Chemical Company; and 97 weight percent vinylidene chloride interpolymer. The vinylidene chloride interpolymer is formed through a suspension polymerization process from a monomer mixture comprising about 85 weight percent vinylidene chloride and about 15 weight percent vinyl chloride, based on total monomer mixture weight. The copolymer has a major melting point of 172° C., as measured by differential scanning calorimetery, and a weight average molecular weight of 70,000. |
| PVdC-2 | A vinylidene chloride interpolymer is formed through a suspension polymerization process. The vinylidene chloride interpolymer is formed from a monomer mixture comprising about 80 weight percent vinylidene chloride and about 20 weight percent vinyl chloride, based on total monomer mixture weight. The copolymer has a major melting point of 162° C., as measured by differential scanning calorimetery, and a weight average molecular weight of 80,000. |
| FRP-1 | FRP-1 is a high density polyethylene commercially available from The Dow Chemical Company under the trade designation HDPE 65053N. The high density polyethylene resin has a density (ASTM Test D-1505) of 0.953 grams per cubic centimeter and a melt index, (ASTM Test D-1238) of 65 grams per 10 minutes. |
| FRP-2 | FRP-2 is a high density polyethylene commercially available from The Dow Chemical Company under the trade designation HDPE 8064N. The high density polyethylene resin has a density (ASTM Test D-1505) of 0.964 grams per cubic centimeter and a melt index, (ASTM Test D-1238) of 8 grams per 10 minutes. |
| FRP-3 | FRP-3 is a low density polyethylene commercially available from The Dow Chemical Company under the trade designation LDPE |

TABLE I-continued

Polymer Components

| Code | |
|---|---|
| | 959. The low density polyethylene resin has a density (ASTM Test D-1505) of 0.923 grams per cubic centimeter and a melt index, (ASTM Test D-1238) of 55 grams per 10 minutes. |
| PP | PP is a polypropylene resin having a density of 0.905 grams per cubic centimeter (ASTM Test D-792 A-2) and a melt flow rate of 325 grams per ten minutes (ASTM Test D-1238). The resin is commercially available from Exxon under the trade designation PP 3145. |
| SA-1 | A salt of an acid which is magnesium hydroxide, commercially available from the Kyowa Chemical Co., under the trade designation Kisuma 5B. |
| SA-2 | A salt of an acid, which is tetrasodium pyrophosphate, commercially available from Monsanto Chemical Co. |
| SA-3 | A salt of an acid which is calcium hydroxy phosphate, commercially available from Monsanto, under the trade designation polymer grade tricalcium phosphate. |
| SA-4 | A salt of acid which is magnesium oxide, commercially available from Merck & Co., under the trade designation Maglite S 3331. |
| SA-5 | A salt of an acid which is sodium orthophosphate, commercially available from the Aldrich Chemical Co., Inc. |

EXAMPLES 1-6

Sample Preparation

Polyblends are formed by blending various quantities of the vinylidene chloride interpolymer, various polymers and salts of acids from Table I.

The polyblends are formed into a generally homogeneous mixture by dry blending the components. The components are loaded in 20-lb batches into a Hobart mixer, and mixed for a period of approximately one hour. The mixtures are extruded through a 2" Hartig single screw extruder having a length to diameter ratio of 10/1. The extruder has the following set temperatures: (a) Zone 1 temperatures=165° C.: (b) Zone 2 temperature=175° C.; and (c) die temperature=175° C. From the extruder, the blends are passed to a stranding die having a diameter of about ¼", and are extruded into a water bath. The strand is then chopped into pellets.

Color Testing of Pellets

The pellets are visually inspected to determine their color. Color is qualitatively rated on a scale of 1 to 10 over a continuous range of discoloration, wherein 1 represents a creamy white color and 10 represents tan.

Carbonaceous Material Contamination Testing

The pellets are loaded into a ¾" extruder having a length to diameter ratio of 24/1 and extruded in a continuous process for a period of about 30 minutes. The extruder has the following set temperatures: (a) first zone temperature=150° C.; (b) second zone temperature=160° C.; (b) third zone temperature=175° C.; and (c) die temperature=175° C.

After extruding the pellets through the extruder, the decomposition of the pellets into carbonaceous material is determined by visually inspecting the root of the extruder screw heel and the extrudate tape. When evaluating the root of the extruder screw heel, pellets are extruded in a continuous process for a period of about 1.5 hours. The extent of carbonaceous material formation is qualitatively rated on a scale of 1 to 5 over a continuous range of carbonaceous material buildup, wherein 1 represents generally no visible carbonaceous material on the surface and 5 represents a layer of carbonaceous material generally completely covering the surface.

Carbonaceous material contamination in the extruder polymeric composition is determined by visual inspection.

Carbonaceous material contamination on the screw is rated on a scale of 1 to 5 over a continuous range of carbonaceous material buildup, wherein 1 represents generally no visible carbonaceous material on the surface and 5 represents a layer of carbonaceous material generally completely covering the surface.

Carbonaceous material contamination in the extrudate tape is rated on a scale of 1 to 5 over a continuous range of carbon buildup. Generally, a 1 represents no carbonaceaous material contamination (e.g. no soft or hard carbon and, obviously no carbon showers) during at least one hour of continuous extrusion. A 5 represents heavy carbonaceaous material contamination (e.g. continuous soft or hard carbon and at least one carbon shower) during at least one hour of continous extrusion.

Mechanical Energy to Extrude

Mechanical energy to extrude and viscosity measurements, which are discussed below, are made on a Haake Buechler Rheocord system 40. Polymeric compositions selected from Table 1 are extruded, in pellet form, through a 24:1 L:D ¾" diameter extruder feeding a slit die rheometer. The die is 1" in width and slit height is 0.051". All rheology data is collected at 175° C. The temperature profile used is 165° C., 175° C., and 175° C. for zones 1 through 3, respectively, of the extruder and the die is set at 175° C.

The shear rates of measurement are controlled by the extruder RPM and are ramped in a stepwise fashion. Shear rate data is calculated from the weight of a sample collected for a 1 minute time period. Over this same time period, pressure data is collected and then averaged The pressure results are used to calculate the shear stress (assuming that the exit pressure is zero).

Torque measurements are made simultaneously to the pressure and flow rate measurements. These values, as for the pressure, are averages collected over the same one minute period.

Viscosity

The viscosity vs. shear rate (rheology) and energy to extrude a material are both measured simultaneously using an extruder and an attached slit die rheometer.

Friction Measurements

Friction is measured by impinging a sample of known cross-section on a rotating roll.

Coefficient of friction (COF) is defined as the ratio of the tangent force to the radial impinging force. An apparatus called a "screw simulator" is used to allow the measurement of COF at conditions normally found in an extruder feed section. The apparatus used is described in detail in the following article which is hereby incorporated by reference: C. I. Chung et al., *Polym. Eng. Sci.*, 17(1), 9 (1977).

The screw simulator consists of a sample chamber which contains the test material while a plunger forces the sample against a rotating, temperature-controlled drum. Different temperatures are tested by allowing the drum to come to thermal equilibrium, then loading the sample and starting the test.

The sample chamber should be held in place tangentially via a stress measuring device. The tangent force is divided by the radial impinging force (plunger force) to obtain the COF. These measurements are made at different drum temperatures and, therefore, the relationship between COF and temperature is generated. In addition, a "mechanical melting" temperature is defined. This is when melting (or devitrification, but in the present examples only crystalline polymers are tested) of the polymer occurs at a drum temperature below the Tm. It is shown by the appearance of a polymer film on the drum. The additional heat to raise the polymer temperature to it's Tm is supplied by the frictional dissipation of the mechanical energy.

Metal temperature at melt, in °C., defines the lowest temperature of the metal roll where melting is observed. The combination of roll thermal properties plus the frictional energy generated causes the material being tested to melt. This has been termed "mechanical melting" in the Chung et al. reference.

The metal temperature at melt is measured by a thermocouple buried ⅛ inch in the surface of the roll, and is checked periodically using a surface pyrometer.

Measurements are made at various temperatures at two pressures, 250 and 500 lb/in² and two drum surface velocities, 7 and 14 in/sec. This resulted in four data sets, COF vs. temperature, for each sample.

The only COF data reported in Table II is at 35° C. The only metal temperature at melt data set forth in Table II is at 14 in/sec, 500 lb/in² conditions.

The results are set forth in Table II.

EXAMPLES 7-11

Sample Preparation

Polymeric compositions are formed by blending various quantities of the vinylidene chloride interpolymer, various polymers and salts of acids from Table I.

The polymeric compositions are formed into a generally homogeneous mixture by dry blending the components. The components are loaded in 20 lb batches into a Hobart mixer, and mixed for a period of approximately one hour.

The powdery mixtures are extruded through a 2" single screw extruder having a length to diameter ratio of 10/1. The extruder has the following set temperatures: (a) Zone 1 temperature=165° C.; (b) Zone 2 temperature=175° C.; and (c) a die temperature=175° C. From the extruder, the blends are passed to a strand die and extruded into a water bath. The strand is then chopped into pellets. However, it is known to one skilled in that art that the powdery mixtures could be fabricated into a variety of articles via similar extrusion processing.

Color Testing of Pellets

The pellets are visually inspected to determine their color. Color is qualitatively rated on a scale of 1 to 10 over a continuous range of discoloration, wherein 1 represents a creamy white color and 10 a rather dark brown.

The results are set forth in Table III.

Extrudate Tape Color

The pellets are loaded into a ¾" Brabender 25:1 ex-

TABLE II

| Examples and Comparative Example | Polymer[1] Type[a] | (%)[b] | SA[2] Type[a] | (%)[b] | PVdC[3] Type[a] | (%)[b] | Color of Pellet[4] | Carbonaceous Material Contamination[5] Screw[a] | Extrudate Tape[b] | Friction[6] COF (@35° C.) | Metal Temp at Melt (°C.) | MEE[7] Q = 20 cc/min[a] | Q = 60 cc/min[b] |
|---|---|---|---|---|---|---|---|---|---|---|---|---|---|
| Comparative Example 1* | PP | 2 | SA-2 | 1.90 | PVdC-1 | balance | 1.8 | 4.5 | 5 | 0.46 | 46 | 540 | 515 |
| Example 1 | FRP-1 | 4 | SA-2 | 1.86 | PVdC-1 | balance | 1 | — | — | 0.37 | 127 | 310 | 385 |
| Example 2 | FRP-1 | 2 | SA-2 | 1.90 | PVdC-1 | balance | 1.8 | 2 | 2 | 0.27 | 117 | 245 | 405 |
| Example 3 | FRP-1 | 1 | SA-2 | 1.92 | PVdC-1 | balance | 3.5 | — | — | 0.33 | 88 | 235 | 400 |
| Example 4 | FRP-1 | 0.5 | SA-2 | 1.93 | PVdC-1 | balance | 4.2 | — | — | 0.23 | 54 | 185 | 400 |
| Example 5 | FRP-2 | 2 | SA-2 | 1.90 | PVdC-1 | balance | 2.3 | — | — | 0.37 | 47 | 475 | 530 |
| Example 6 | FRP-3 | 2 | SA-2 | 1.90 | PVdC-1 | balance | 2.3 | — | — | 0.23 | 124 | 195 | 390 |

*not an example of the invention
— = not measured.
[1]Polymer = (a) type: a polymer as set forth in Table I, and (b) %: in weight percent based upon the total weight of the polymeric composition.
[2]SA = (a) type: salts of acids selected from Table I, and (b) %: in weight percent based upon the total weight of the polymeric composition.
[3]PVdC-1 = (a) type: a vinylidene chloride copolymer as set forth in Table I, and (b) %, is based on the total weight of the polymeric composition.
[4]Color = color of pellet according to visual inspection using a scale of 1 to 10, wherein 1 represents a creamy white color and 10 represents a tan.
[5]Carbonaceous material contamination = according to visual inspection of (a) the extruder screw, and (b) the extrudate.
(a) Carbonaceous material contamination on the screw is rated on a scale of 1 to 5 over a continuous range of carbonaceous material buildup, wherein 1 represents generally no visible carbonaceous material on the surface and 5 represents a layer of carbonaceous material generally completely covering the surface.
(b) Carbonaceous material contamination in the extrudate tape is rated on a scale of 1 to 5 over a continuous range of carbon buildup. Generally, a 1 represents no carbonaceous material contamination (e.g. no soft or hard carbon and, obviously no carbon showers) during at least one hour of continuous extrusion. A 5 represents heavy carbonaceous material contamination (e.g. continuous soft or hard carbon and at least one carbon shower) during at least one hour of continuous extrusion.
[6]COF = coefficient of friction @35° C., 500 psi, and 14 in/sec.
[7]MEE = mechanical energy to extrude in joules/cc according to $(2\pi) \times (\tau) \times (rpm)/Q$, wherein Q is (a) 20 cc/min and (b) 60 cc/min.

As can be seen from the above table, the compositions of the present invention possess an excellent extrudability as evidenced by the good color, as well as the relatively low level of carbon contamination, found in the extruded samples.

truder, and extruded in a continuous process for a period of about 20 minutes. The extruder has the following set temperatures: (a) Zone 1 temperature=165° C.; (b) Zone 2 temperature=175° C.; (c) Zone 3 temperature=175° C.; and (d) die temperature=175° C.

The extrudate tapes are visually inspected to determine their color. Color is qualitatively rated on a scale of 1 to 10 over a continuous range of discoloration, wherein 1 represents a creamy white color and 10 a rather dark brown.

The results are set forth in Table III.

TABLE III

| Example No. | PO[1] | | SA[2] | | PVdC[3] | | Color[4] | |
|---|---|---|---|---|---|---|---|---|
| | Type[a] | (%)[b] | Type[a] | (%)[b] | Type[a] | (%)[b] | Pellet[a] | Extrudate Tape[b] |
| 7 | FRP-1 | 2 | SA-1 | 1 | PVdC-2 | balance | 1 | 1 |
| 8 | FRP-1 | 2 | SA-2 | 1 | PVdC-2 | balance | 4 | 4.6 |
| 9 | FRP-1 | 2 | SA-3 | 1 | PVdC-2 | balance | 2.2 | 5.8 |
| 10 | FRP-1 | 2 | SA-4 | 1 | PVdC-2 | balance | 3.8 | 2.6 |
| 11 | FRP-1 | 2 | SA-5 | 1 | PVdC-2 | balance | 2.8 | 2.4 |

[1]FRP = (a) type: a FRP as set forth in Table I, and (b) %: in weight percent based upon the total weight of the polymeric composition.
[2]SA = (a) type: salts of acids selected from Table I, and (b) %: in weight percent based upon the total weight of the polymeric composition.
[3]PVdC-2 = (a) type: a vinylidene chloride copolymer as set forth in Table I, and (b) %, is based on the total weight of the polymeric composition.
[4]Color = according to visual inspection of (a) pellets and (b) extrudate tape, on a scale of 1 to 10, wherein 1 represents a creamy white color and 10 a rather dark brown.

EXAMPLES 12-16

Examples 7-11, respectively, are repeated with the following exception: about 15 weight percent of FRP-1 is substituted for 2 weight percent of FRP-1.

The pellets and extrudate tapes exhibited good color, and reduced carbonaceous material contamination.

EXAMPLES 17-21

Examples 7-11, respectively, are repeated with the following exception: 40 weight percent of FRP-2 is substituted for 2 weight percent of FRP-1.

The pellets and extrudate tapes exhibited good color, and reduced carbonaceous material contamination.

EXAMPLES 22-27

Examples 7-11, respectively, are repeated with the following exception: about 0.1 weight percent of FRP-3 is substituted for the 2 weight percent of FRP-1.

The pellets and extrudate tapes exhibit good color, and reduced carbonaceous material contamination.

EXAMPLES 28-33

Examples 7-11, respectively, are repeated with the following exception: about 15 weight percent of FRP-3 is substituted for the 2 weight percent of FRP-1.

The pellets and extrudate tapes exhibit good color, and reduced carbonaceous material contamination.

EXAMPLES 34-60

Examples 7-33, respectively, are repeated with the following exception: the vinylidene chloride interpolymer is formed from a monomer mixture comprising about 94 weight percent vinylidene chloride and about 6 weight percent methyl acrylate, based on total monomer mixture weight. The copolymer has a major melting point of 165° C. and weight average molecular weight of 90,000.

The pellets and extrudate tapes exhibit good color, and reduced carbonaceous material contamination.

Although the invention has been described in considerable detail, with reference to certain preferred embodiments thereof, it will be understood that variations and modifications can be affected within the spirit and scope of the invention as described above and as defined in the appended claims.

What is claimed is:

1. A polymeric blend composition consisting essentially of:
   (a) a vinylidene chloride interpolymer, the interpolymer comprising vinylidene chloride and at least one monoethylenically unsaturated monomers copolymerizable with vinylidene chloride, said ethylenically unsaturated comonomer being maintained below an amount sufficient to destroy the semicrystalline character of the interpolymer; and
   (b) from about 0.1 to about 40 weight percent, based on the total weight of the polymeric composition, of a friction reducing olefin polymer (FRP) having a melt flow rate of less than 325 grams per ten minutes, an average molecular weight of at least 10,000, a viscosity of at least 750 poise at a temperature of 175° C., measured at 100 sec$^{-1}$, and a coefficient of friction such that the frictional coefficient of the polymeric composition is at least 20 percent lower than the frictional coefficient of the polymeric composition without the FRP,
whereby the mechanical energy to extrude of the polymeric composition is decreased.

2. The polymeric composition of claim 1 wherein the monomer or monomers copolymerizable with the vinylidene chloride are selected from the group consisting of vinyl chloride, alkyl acrylates, alkyl methacrylates, acrylic acid, methacrylic acid, itaconic acid, acrylonitrile, and methacrylonitrile.

3. The polymeric composition of claim 1, wherein the FRP is present in an amount of from about 0.3 to about 15 weight percent, based on the total weight of the polymeric composition.

4. The polymeric composition of claim 3, wherein the FRP is present in an amount of from about 0.4 to about 5 weight percent, based on the total weight of the polymeric composition.

5. The polymeric composition of claim 4, wherein the FRP is present in an amount of from about 0.5 to about 2 weight percent, based on the total weight of the polymeric composition.

6. The polymeric composition of claim 1 wherein the FRP is selected from the group consisting of low density polyethylene, medium density polyethylene, high density polyethylene, and polypropylene.

7. The polymeric composition of claim 6 wherein the FRP is high density polyethylene.

8. A polymeric blend composition consisting essentially of:
   (a) a vinylidene chloride interpolymer, the interpolymer comprising vinylidene chloride and at least one monoethylenically unsaturated monomers copolymerizable with vinylidene chloride, said ethylenically unsaturated comonomer being maintained below an amount sufficient to destroy the semicrystalline character of the interpolymer; and (b) from about 2 to about 0.5 weight percent, based on the total weight of the polymeric composition, of a friction reducing polymer (FRP) having a melt flow rate of less than 325 grams per ten minutes, an average molecular weight of at least 10,000, a viscosity of at least 750 poise at a temperature of 175° C., measured at 100 sec$^{-1}$., and a coefficient of friction such that the frictional coefficient of the polymeric composition is at least 20 percent lower than the frictional coefficient of the polymeric composition without the FRP, whereby and the mechanical energy to extrude of the polymeric composition is decreased.

9. The polymeric composition of claim 1, wherein the composition is in powder form.

10. The polymeric composition of claim 1, wherein the composition is in the form of a pellet.

11. An article formed from a polymeric composition which consisting essentially of:
(a) a vinylidene chloride interpolymer, the interpolymer comprising vinylidene chloride and at least one monoethylenically unsaturated monomers copolymerizable with vinylidene chloride, said ethylenically unsaturated comonomer being maintained below an amount sufficient to destroy the semicrystalline character of the interpolymer; and
(b) from about 0.1 to about 40 weight percent, based on the total weight of the polymeric composition, of a friction reducing olefin polymer (FRP) having a melt flow rate of less than 325 grams per ten minutes, an average molecular weight of at least 10,000, a viscosity of at least 750 poise at a temperature of 175° C., measured at 100 sec$^{-1}$., and a coefficient of friction such that the frictional coefficient of the polymeric composition is at least 20 percent lower than the frictional coefficient of the polymeric composition without the FRP, whereby and the mechanical energy to extrude of the polymeric composition is decreased.

12. The article of claim 14 wherein the FRP is high density polyethylene.

13. A polymeric blend composition consisting essentially of
(a) a vinylidene chloride interpolymer, the interpolymer comprising vinylidene chloride and at least one monoethylenically unsaturated monomers copolymerizable with vinylidene chloride, said ethylenically unsaturated comonomer being maintained below an amount sufficient to destroy the semicrystalline character of the interpolymer;
(b) from about 0.1 to about 40 weight percent, based on the total weight of the polymeric composition, of a friction reducing olefin polymer (FRP) having a melt flow rate of less than 325 grams per ten minutes, an average molecular weight of at least 10,000, a viscosity of at least 750 poise at a temperature of 175° C., measured at 100 sec$^{-1}$., and a coefficient of friction such that the frictional coefficient of the polymeric composition is at least 20 percent lower than the frictional coefficient of the polymeric composition without the FRP, whereby and the mechanical energy to extrude of the polymeric composition is decreased: and
(c) a salt of an acid in an amount of from about 0.05 to about 5 weight percent, based on the total weight of the polymeric composition.

14. The polymeric composition of claim 13, wherein the FRP is present in an amount of from about 0.3 to about 15 weight percent, based on the total weight of the polymeric composition.

15. The polymeric composition of claim 13 wherein the FRP is selected from the group consisting of low density polyethylene, medium density polyethylene, high density polyethylene, and polypropylene.

16. The polymeric composition of claim 15 wherein the FRP is high density polyethylene.

17. The polymeric composition of claim 13, wherein the salt of an acid is present in an amount of from about 0.1 to about 3 weight percent, based on the total weight of the polymeric composition.

18. A polymeric composition consisting essentially of:
(a) a vinylidene chloride interpolymer in an amount of from about 96 to about 99.1 weight percent, said weight percent being based on the total weight of the polymeric composition, the interpolymer comprising vinylidene chloride and at least one monoethylenically unsaturated monomers copolymerizable with vinylidene chloride, said-ethylenically unsaturated comonomer being maintained below an amount sufficient to destroy the semicrystalline character of the interpolymer:
(b) from about 0.5 to about 2 weight percent, based on the total weight of the polymeric composition, of a friction reducing olefin polymer (FRP) having a melt flow rate of less than 325 grams per ten minutes, an average molecular weight of at least 10,000, a viscosity of at least 750 poise at a temperature of 175° C., measured at 100 sec$^{-1}$., and a coefficient of friction such that the frictional coefficient of the polymeric composition is at least 20 percent lower than the frictional coefficient of the polymeric composition without the FRP, ; and
(c) a salt of an acid in an amount of from about 0.4 to about 2 weight percent, based on the total weight of the polymeric composition.

19. The polymeric composition of claim 13, wherein the composition is in the form of a pellet.

20. The polymeric composition of claim 14, wherein the composition is in the form of a pellet.

21. The polymeric composition of claim 17, wherein the composition is in the form of a pellet.

22. A process comprising the step of pelletizing the polymeric composition of claim 1.

23. A process comprising the step of pelletizing the polymeric composition of claim 13.

24. An article formed from a polymeric composition which consists essentially of: (a) a vinylidene chloride interpolymer in an amount of from about 55 to about 99.85 weight percent, the interpolymer comprising vinylidene chloride and at least one monoethylenically unsaturated monomers copolymerizable with vinylidene chloride, said—ethylenically unsaturated comonomer being maintained below an amount sufficient to destroy the semicrystalline character of the interpolymer: (b) from about 0.1 to about 40 weight percent, based on the total weight of the polymeric composition, of a friction reducing olefin polymer (FRP) having a melt flow rate of less than 325 grams per ten minutes, an average molecular weight of at least 10,000, a viscosity of at least 750 poise at a temperature of 175° C., measured at 100 sec$^{-1}$., and a coefficient of friction such that the frictional coefficient of the polymeric composition is at least 20 percent lower than the frictional coefficient of the polymeric composition without the FRP, ; and (c) a salt of an acid in an amount of from about 0.05 to about 5 weight percent, based on the total weight of the polymeric composition.

* * * * *

UNITED STATES PATENT AND TRADEMARK OFFICE
CERTIFICATE OF CORRECTION

PATENT NO. : 5,115,029

DATED : May 19, 1992

INVENTOR(S) : Donald E. Kirkpatrick, et al

It is certified that error appears in the above-identified patent and that said Letters Patent is hereby corrected as shown below:

On title page, item [63], Related U.S. Application Data, delete "Jan. 15, 1988" and insert --July 15, 1988--

Column 17, line 5, delete "reducing polymer" and insert --reducing olefin polymer--.

Col. 18, line 20, delete "said-ethylenically" and insert --said ethylenically--.

Col. 18, line 52, delete "said-ethylenically" and insert --said ethylenically--.

Signed and Sealed this

Sixteenth Day of November, 1993

Attest:

BRUCE LEHMAN

*Attesting Officer*    *Commissioner of Patents and Trademarks*